(12) United States Patent
Guajardo et al.

(10) Patent No.: US 11,582,530 B2
(45) Date of Patent: Feb. 14, 2023

(54) METHOD AND APPARATUS FOR TRANSMISSION AND RECEPTION OF WIRELESS DATA

(71) Applicant: DISH Wireless L.L.C., Englewood, CO (US)

(72) Inventors: Marcel Guajardo, Englewood, CO (US); Jeffery Romaniuk, Castle Rock, CO (US)

(73) Assignee: DISH Wireless L.L.C., Englewood, CO (US)

( * ) Notice: Subject to any disclaimer, the term of this patent is extended or adjusted under 35 U.S.C. 154(b) by 58 days.

(21) Appl. No.: 16/878,719

(22) Filed: May 20, 2020

(65) Prior Publication Data
US 2021/0368244 A1 Nov. 25, 2021

(51) Int. Cl.
| | |
|---|---|
| H04N 7/173 | (2011.01) |
| H04N 21/647 | (2011.01) |
| H04N 21/2662 | (2011.01) |
| H04W 72/08 | (2009.01) |
| H04W 36/30 | (2009.01) |
| H04N 21/41 | (2011.01) |

(52) U.S. Cl.
CPC ....... *H04N 21/647* (2013.01); *H04N 21/2662* (2013.01); *H04N 21/41265* (2020.08); *H04W 36/30* (2013.01); *H04W 72/085* (2013.01)

(58) Field of Classification Search
CPC .......... H04N 21/647; H04N 21/41265; H04N 21/2662; H04W 36/30; H04W 72/085
See application file for complete search history.

(56) References Cited

U.S. PATENT DOCUMENTS

| | | | |
|---|---|---|---|
| 2009/0131101 A1* | 5/2009 | Van Rooyen | ...... H04N 21/6131 455/552.1 |
| 2012/0042349 A1* | 2/2012 | Ng | ................... H04N 21/44209 725/109 |
| 2012/0077466 A1* | 3/2012 | O'Mahony | .... H04N 21/234327 455/414.1 |
| 2013/0254828 A1* | 9/2013 | Reimers | ........... H04N 21/44209 725/134 |
| 2020/0221186 A1* | 7/2020 | Shambro, Jr. | ...... H04N 21/2223 |

* cited by examiner

*Primary Examiner* — Mulugeta Mengesha
(74) *Attorney, Agent, or Firm* — KW Law, LLP (57) ABSTRACT

Systems and processes are provided for receiving a request for an audio video program from a display device, transmitting the request for the audio video program via a bidirectional network, receiving the audio video program via the bidirectional network wherein the audio video program is received at a first data rate, transmitting an alternate request for the audio video program via the bidirectional network wherein the alternate request for the audio video program includes are request for the audio video program to be transmitted via a unidirectional wireless transmission, receiving the audio video program via the unidirectional wireless transmission, and transmitting the audio video program to the display device.

16 Claims, 5 Drawing Sheets

METHOD AND APPARATUS FOR TRANSMISSION AND RECEPTION OF WIRELESS DATA

TECHNICAL FIELD

The following discussion generally relates to transmission and reception of data and audio video programming on an electronic device. More particularly, the following discussion relates to determining a quality of a first wireless transmission channel and requesting, via the first wireless transmission channel, a data transmission to be transmitted on an alternate transmission channel.

BACKGROUND

The real time presentation of audio video programs, such as via broadcast television, has been an entertainment staple for the better part of a century. Early television broadcast stations in the United States transmitted black and white television programming using the National Television System Committee (NTSC) standard. In 1954 the NTSC introduced a color broadcast format wherein a color information subcarrier was added to the black and white luminance signal. In 2015, NTSC broadcasts were replaced with Advanced Television System Committee (ATSC) digital television broadcasts. Today, audio video programming may be received via over the air broadcast, cable networks, satellite transmission, streaming via the internet or other network connection in many different resolutions and formats.

With all of the different delivery systems for audio video content and all off the separate devices used to view the audio video content, a viewer may have many different methods to receive the same content. However, at various times, certain content delivery systems may become unavailable, such as during adverse weather or during times of heavy usage. This may create a problem in that a preferred user device, such as a mobile smartphone, may not be able to receive all the available signal types and therefore the desired content may not be available to a user on the preferred device. To overcome these problems, it would be desirable to facilitate a method and apparatus for receiving video content while overcoming the aforementioned content delivery problems. Other desirable features and characteristics will become apparent from the subsequent detailed description and the appended claims, taken in conjunction with the accompanying drawings and this background section.

BRIEF SUMMARY

Disclosed herein are human machine interface methods and systems and related circuitry for provisioning computational systems, methods for making and methods for operating such systems, and system equipped with electronic data reception systems. By way of example, and not limitation, presented are various embodiments of reception and retransmission of an audio video program and other data in a video device are disclosed herein.

In accordance with an aspect of the disclosure, a method including receiving a request for an audio video program from a display device, transmitting the request for the audio video program via a bidirectional network, receiving the audio video program via the bidirectional network wherein the audio video program is received at a first data rate, transmitting an alternate request for the audio video program via the bidirectional network wherein the alternate request for the audio video program includes are request for the audio video program to be transmitted via a unidirectional wireless transmission, receiving the audio video program via the unidirectional wireless transmission, and transmitting the audio video program to the display device.

In accordance with another aspect of the disclosure wherein the bidirectional network is a cellular data network.

In accordance with another aspect of the disclosure the bidirectional network is a 5G wireless communications network.

In accordance with another aspect of the disclosure wherein the unidirectional wireless transmission is an ATSC encoded wireless transmission.

In accordance with another aspect of the disclosure wherein the unidirectional wireless transmission is a transmitted via a television broadcast antenna.

In accordance with another aspect of the disclosure wherein the audio video program is transmitted to the user device via a wireless local area network.

In accordance with another aspect of the disclosure wherein the audio video program is transmitted to the user device via an IEEE 802.11 encoded signal.

In accordance with another aspect of the disclosure wherein the alternate request for the audio video program is transmitted in response to a signal quality being lower than a threshold signal quality.

In accordance with another aspect of the disclosure, an apparatus including an ATSC receiver configured for receiving an ATSC signal and decoding the ATSC signal to generate a first data signal, a cellular receiver configured for receiving a cellular data signal and decoding the cellular data signal to generate a second data signal, a cellular transmitter configured for transmitting a data request and a network request via a wireless cellular network, a wireless local area network transceiver for transmitting a wireless network signal and receiving a data request, a processor operative to receive the data request from the wireless local area network transceiver, to couple the data request to the cellular transmitter, to receive the data via the cellular data signal from the cellular receiver, to determine a quality of the data, to transmit a network request in response to the quality of the data being below a threshold quality level, for receiving the data via the ATSC signal, and for coupling the data to the wireless local area network transceiver for transmission via the wireless network signal.

In accordance with another aspect of the disclosure wherein the cellular receiver and the cellular transmitter form a cellular transceiver.

In accordance with another aspect of the disclosure wherein the cellular data signal is a 5G formatted cellular data signal.

In accordance with another aspect of the disclosure wherein the ATSC signal is transmitted by an ATSC television broadcaster.

In accordance with another aspect of the disclosure wherein the processor is further operative to receive an ATSC transmission confirmation via the cellular receiver and wherein the ATSC transmission confirmation is indicative of an ATSC channel.

In accordance with another aspect of the disclosure wherein the data request is generated by a user display device in response to a user input.

In accordance with another aspect of the disclosure wherein the wireless network signal is transmitted to a user display device.

In accordance with another aspect of the disclosure wherein the data is an audio video program.

In accordance with another aspect of the disclosure wherein the data is an audio video program and wherein the audio video program is received sequentially such that a first portion of the audio video program may be transmitted via the wireless network signal while a second portion of the audio video program is being received via the ATSC signal.

In accordance with another aspect of the disclosure wherein the apparatus is a hotspot operative to transcode an audio video program.

In accordance with another aspect of the disclosure, a wireless hotspot including a cellular transceiver configured to transit a request for the ATSC encoded audio video program and for receiving a cellular signal, an ATSC receiver configured to receive an ATSC signal having an ATSC encoded audio video program, an ATSC decoder for decoding the ATSC encoded audio program to generate a desired audio video program, a wireless local area network transceiver operative to receive a request for the desired audio video program and to transmit the desired audio video program to a user display device, and a processor operative to receive the request for the desired audio video program, to determine a signal quality of the cellular signal in response to the request for the desired audio video program, to transmit the request for the ATSC encoded audio video program in response to the signal quality being lower than a threshold signal quality, for receiving the desired audio video program from the ATSC decoder and to couple the desired audio video program to the wireless local area network transceiver.

In accordance with another aspect of the disclosure wherein the signal quality of the cellular signal is determined in response to at least one of a bandwidth, a bit rate, a bit error rate, and an amplitude.

The above advantage and other advantages and features of the present disclosure will be apparent from the following detailed description of the preferred embodiments when taken in connection with the accompanying drawings.

BRIEF DESCRIPTION OF THE DRAWING FIGURES

The exemplary embodiments will hereinafter be described in conjunction with the following drawing figures, wherein like numerals denote like elements, and wherein.

The exemplifications set out herein illustrate preferred embodiments of the disclosure, and such exemplifications are not to be construed as limiting the scope of the disclosure in any manner.

DETAILED DESCRIPTION

The following detailed description is intended to provide various examples, but it is not intended to limit the disclosure or the application and uses of the disclosure. Furthermore, there is no intention to be bound by any theory presented in the preceding background or the following detailed description.

The general concepts described herein may be implemented in any audio video display device or connected device that may be used for audio video streaming or presentation to an audio video display device the like. For convenience of illustration, the following discussion often refers to a video signal processing device, such as a wireless hotspot, operative to receive audio video content encoded in a first format, to decode the video content, encode the audio video content in a second format, and then transmit the audio video content encoded in the second format. The actions taken in response to the transmission, presentation and alteration of audio video content for display to a viewer may also be associated with the functionality of the mobile phones, portable electronic entertainment devices, and any other electronic media device capable of image or video display and/or playback. Additional details and examples are provided in the following description.

Figure 1:
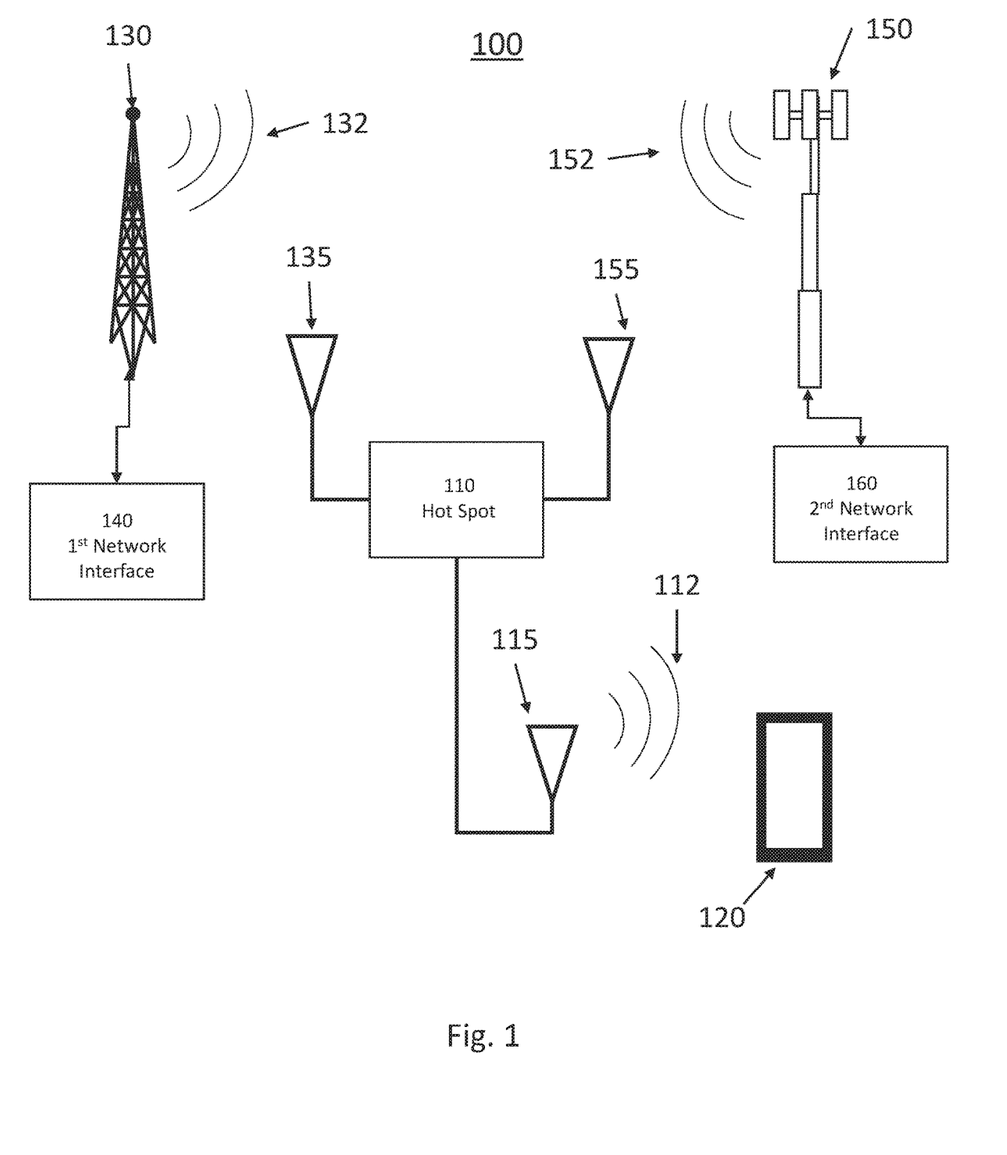
FIG. 1 shows an environment for reception of an audio video program and other data in a video device according to an exemplary embodiment of the present disclosure.

Turning now to FIG. 1, an environment 100 for a system for reception of an audio video program and other data in a device according to an exemplary embodiment of the present disclosure is shown. The exemplary system may include a hotspot 110 having an ATSC antenna 135, a cellular network antenna 155 and a wireless network antenna 115.

In this exemplary embodiment, the exemplary hotspot 110 is a device or software application with accompanying hardware used to receive a wireless signal in a first wireless transmission format, such as 5G, to decode the received wireless signal to extract the desired data, to encode the desired data into a second wireless transmission format, such as Wi-Fi, and to transmit the encoded desired data. In addition, the exemplary hotspot 110 may receive and decode wireless signals encoded in a plurality of transmission formats, such as ATSC 1.0, ATSC 3.0, 5G, 4G LTE, DVB-T, DVB-S, ISBD-T, FM/AM, and the like.

In the exemplary embodiment, the hotspot 110 may receive an ATSC wireless data transmission 123 from an ATSC transmitter 130 via an ATSC antenna 135. The ATSC transmitter 130 may be operative to receive data via a first network interface 140 wherein the first network interface 140 may be connected to the internet. The ATSC transmitter 130 may further receive data from a satellite signal receiver, or directly via a video production studio or the like. For example, the ATSC transmitter 130 may be collocated with a satellite signal receiver operative to receive audio video programming and the like from a production studio wherein the production studio is operative to transmit the audio video programming to the satellite signal receiver via a satellite. The ATSC transmitter 130 is operative to receive the audio video programming from the satellite signal receiver, to encode the audio video programming according to the ATSC transmission format and to transmit the ATSC encoded audio video programming as the ATSC wireless data transmission 132.

The hotspot 110 may receive a cellular data signal, such as a 5G signal, from a cellular transceiver 150. In addition, the hotspot 110 may be operative to transmit data to the cellular transceiver 150 via a cellular network antenna 155. The cellular transceiver 150 is operative to transmit and receive data via a second network interface 160. The second network interface 160 may be coupled to the internet or may be coupled to a fiber optic network, or the like, for communicating to data service providers and other network servers.

In this exemplary embodiment, the hot spot 110 is operative to transmit and receive data from a user device 120, such as a mobile phone or computer, via a wireless networking signal 112 transmitted by a wireless network antenna 115. In an exemplary embodiment, a user may request, via a user interface on a user device 120, a first audio video program from a steaming audio video services provider. The hotspot 110 may then receive the request via the wireless network antenna 115 and generate a request to the audio video service provider. The hotspot 110 is then operative to transmit the request via the cellular network antenna 155. The request is then received by the cellular transceiver 150 and transmitted to the steaming audio video services provider. The cellular transceiver 150 is then operative to receive the first audio video program from the steaming audio video services provider and to transmit the first audio video program to the hotspot 110 via the cellular wireless signal 152. The hotspot 110 is then operative to receive the first audio video program in the cellular wireless signal format, such as 5G, to decode the cellular wireless signal format to extract the first audio video program, to encode the first audio video program in a wireless network format, such as Wi-Fi or the like, and to transmit the W-Fi encoded first audio video program to the user device 120.

In another exemplary embodiment, a user may request reception a broadcast channel on the user device 120. The hotspot 110 is operative to receive the request via the wireless network antenna 115 and to tune a tuner or the like within the hotspot 110 to receive the requested broadcast channel. The hotspot 110 is then operative to tune and demodulate the requested broadcast channel and to convert the requested broadcast channel into a video stream suitable for transmission via a wireless network signal 112. The hotspot 110 is then operative to transmit the video stream to the user device 120 using the wireless network antenna 115 via a wireless network signal 112.

In another exemplary embodiment the hotspot 110 is operative to receive a request for a streaming audio video program from the user device via the wireless network antenna 115. In response, the hotspot 110 is operative to transmit the request for the audio video program to the cellular transceiver 150. The hotspot 110 is then operative to receive the audio video program from the cellular transceiver 150. The hotspot 110 is then operative to decode the audio video program and to determine a quality of the audio video program. The quality of the audio video program may be determined in response to transmission delays, low data rate, low bandwidth, signal strength or signal quality among other factors. The hotspot 115 then determines if the audio video program has a sufficient quality for transmission to the user device 120. If the audio video program does not have sufficient quality for transmission to the user device 120, the hotspot 110 generates a request for the audio video program via the ATSC transmitter 130 and then transmits this request to the cellular transceiver 150. The cellular transceiver 150 retransmits this request to the ATSC transmitter via a network, such as the internet, via the second network interface 160 and the first network interface 140. In response to receiving the request, the ATSC transmitter 130, or an associated device, is operative to retrieve the audio video program via the first network interface 140 and to transmit the audio video program to the hotspot 110 via the ATSC wireless data transmission 132. The hotspot 135 then receives the audio video program from the ATSC transmitter 130, decodes the ATSC signal to extract the audio video program, encodes the audio video program into a video stream suitable for transmission via a wireless network signal 112. The hotspot 110 is then operative to transmit the audio video program to the user device 120 using the wireless network antenna 115 via a wireless network signal 112. In this exemplary embodiment, the transmission means used to receive the audio video program may be not apparent to the user.

Figure 2:
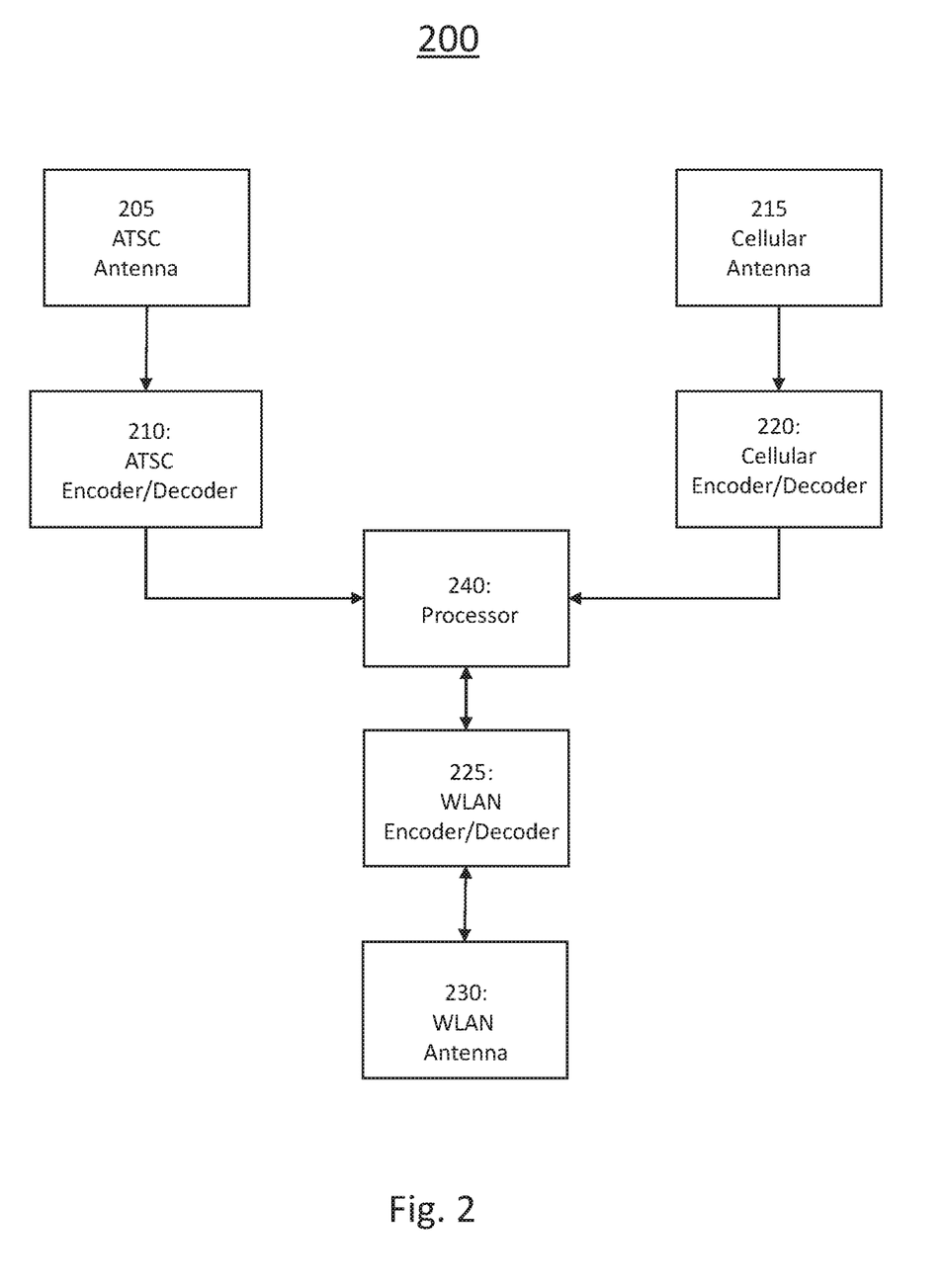
FIG. 2 shows a block diagram illustrating a system for reception of an audio video program and other data in a video device according to an exemplary embodiment of the present disclosure.

Turning now to FIG. 2, an exemplary hotspot 200 for reception and retransmission of an audio video programs and other data in a video device according to an exemplary embodiment of the present disclosure is shown. The exemplary hotspot 200 may include an ATSC antenna 205, an ATSC encoder/decoder 210, cellular antenna 215, cellular encoder/decoder 220, wireless local area network (WLAN) encoder/decoder 225, WLAN antenna 230, and processor 240.

In this exemplary embodiment the ATSC antenna 205 is operative to receive audio video programming broadcast and data from an ATSC transmitter. The received signal from the ATSC transmitter may be encoded in an ATSC 1.0 or ATSC 3.0 format. The ATSC antenna 205 maybe an external antenna coupled to the hotspot via an antenna connector or may be integral to the hotspot 200. The ATSC encoder/decoder 210 is operative to receive the ATSC signal from the ATSC antenna 205 and to decode the ATSC signal for coupling to the processor 240. The ATSC encoder/decoder 210 maybe operative to generate an audio video stream in response to an audio video program received via the ATSC transmission or may be able to extract data from the ATSC transmission and a couple of the data to the processor 240. The ATSC encoder/decoder 210 may be operative to encode ATSC data packets for content access authorization and messaging. The ATSC antenna 205 may be further operative to transmit data received from the ATSC encoder/decoder 210.

In this exemplary embodiment the cellular antenna 215 is operative to transmit data from the cellular encoder/decoder 220 and to receive data, such a streamed audio video programming, from a cellular transceiver. In one example, the transmitted and received signals from the cellular antenna 215 may be encoded in a 5G format. The cellular antenna 215 may be an external antenna coupled to the hotspot 200 via an antenna connector or may be integral to the hotspot 200. The cellular encoder/decoder 220 is operative to receive data from the processor 240 and to encode this data in a format suitable for cellular wireless transmission via the cellular antenna 215. The cellular encoder/decoder 220 is further operative to decode cellular signals received via the cellular antenna 215. The cellular encoder/decoder 220 couples the decoded data to the processor 240. Alternatively, the cellular encoder/decoder 220 may couple the decoded data to a memory for later access by the processor 240.

The WLAN antenna 230 is configured to receive and transmit wireless data signals via a wireless local area network to a user device. In one exemplary embodiment, the wireless local area network is a Wi-Fi 6 network encoded according to the IEEE 802.11 standard. The WLAN antenna 230 may be integral to the hotspot 200 or may be an external antenna coupled to the hotspot 200. The WLAN antenna 230 is configured to couple data to and from the WLAN encoder/decoder 225. The WLAN encoder/decoder 225 is operative to receive a data signal from the WLAN antenna 230 and to decode this data signal to extract the encoded data and to couple this data to the processor 240. Furthermore, the WLAN encoder/decoder 225 is configured to encode data received from the processor 240 into a format suitable for wireless transmission via the WLAN antenna 230.

The processor 240 is operative to receive data from the ATSC encoder/decoder 210, the cellular encoder/decoder 220 and the WLAN encoder/decoder 225. The processor 240 may receive requests and data from one source, such as the WLAN encoder/decoder 225, and route the data appropriately in response to request. For example, the processor 240 may receive a request for an ATSC broadcast channel from a user device via the WLAN encoder/decoder 225. The processor 240 may then generate a control signal to couple to the ATSC encoder/decoder 210 in order for the ATSC encoder/decoder 210 to decode the requested ATSC broadcast channel. The processor 240 may then receive the audio video stream decoded by the ATSC encoder/decoder 210 and to couple this audio video stream to the WLAN encoder/decoder 225. In addition, the processor 240 may be operative to receive data from the WLAN encoder/decoder 225 and couple this data to the ATSC encoder/decoder 210 for transmission by the ATSC antenna 205.

In one exemplary embodiment, the processor 240 may be operative to receive a request for an audio video program from the WLAN encoder/decoder 225. The request may further be indicative of a source for the audio video program wherein the source is an internet streaming services server. The processor 240 may then couple the request to the cellular encoder/decoder 220 for encoding and transmission to a cellular transceiver or the like. The processor 240 may then receive a data stream associated with the audio video program from the cellular encoder/decoder 220. The processor 240 is then operative to verify the quality of the data associated with the audio video program. If the quality is lower than a threshold level, indicative of a degraded audio video program quality unsuitable for viewing by a user, the processor 240 is then operative to generate a request for the audio video program to be transmitted via an ATSC signal. The request is then coupled to the cellular encoder/decoder 220 for transmission to a cellular transceiver. The cellular transceiver is then operative to couple the request to an ATSC transmitter, or related server, via a network such as the internet.

In this exemplary embodiment, the processor 240 may then receive a response to the request from the ATSC transmitter via the cellular encoder/decoder 220 indicative of an approval of the request, a frequency or channel for ATSC transmission of the audio video program, and other identifying data associated with the ATSC transmission such as encryption information, destination identifiers, source identifiers, or the like. The processor 240 is then operative to couple the data associated with the ATSC transmission to the ATSC encoder/decoder 210 such that the ATSC transmission may be decoded and the audio video program coupled to the processor 240. In response to receiving the audio video program from the ATSC encoder/decoder 210, the processor 240 couples the audio video program to the WLAN encoder/decoder 225 for encoding and transmission to the user.

In another exemplary embodiment the processor 240 is configured to determine an available bandwidth of an available cellular wireless network in response to receiving a request for an audio video program from a user device wherein the audio video program will be received via the cellular wireless network. The processor 240 then determines if the available bandwidth is suitable for a required quality of reception of the audio video program. If the available bandwidth is not suitable, the processor 240 generates a request for transmission of the audio video program via an ATSC transmission and transmits the request to an ATSC transmitter via the cellular wireless network.

In an additional embodiment, the processor 240 may be configured to receive the request for an audio video program generated by a user device. The processor 240 then determines a preferred available transmission means for receiving the audio video program, such as an ATSC transmission channel or a cellular network transmission channel. The processor 240 is then operative to generate a request indicative of the preferred transmission means in response to the determination and couples this request to the cellular encoder/decoder 220 to transmission via the cellular network. The preferred available transmission means may be determined in response to available bandwidth, cost, data traffic levels, signal quality or the like.

Figure 3:
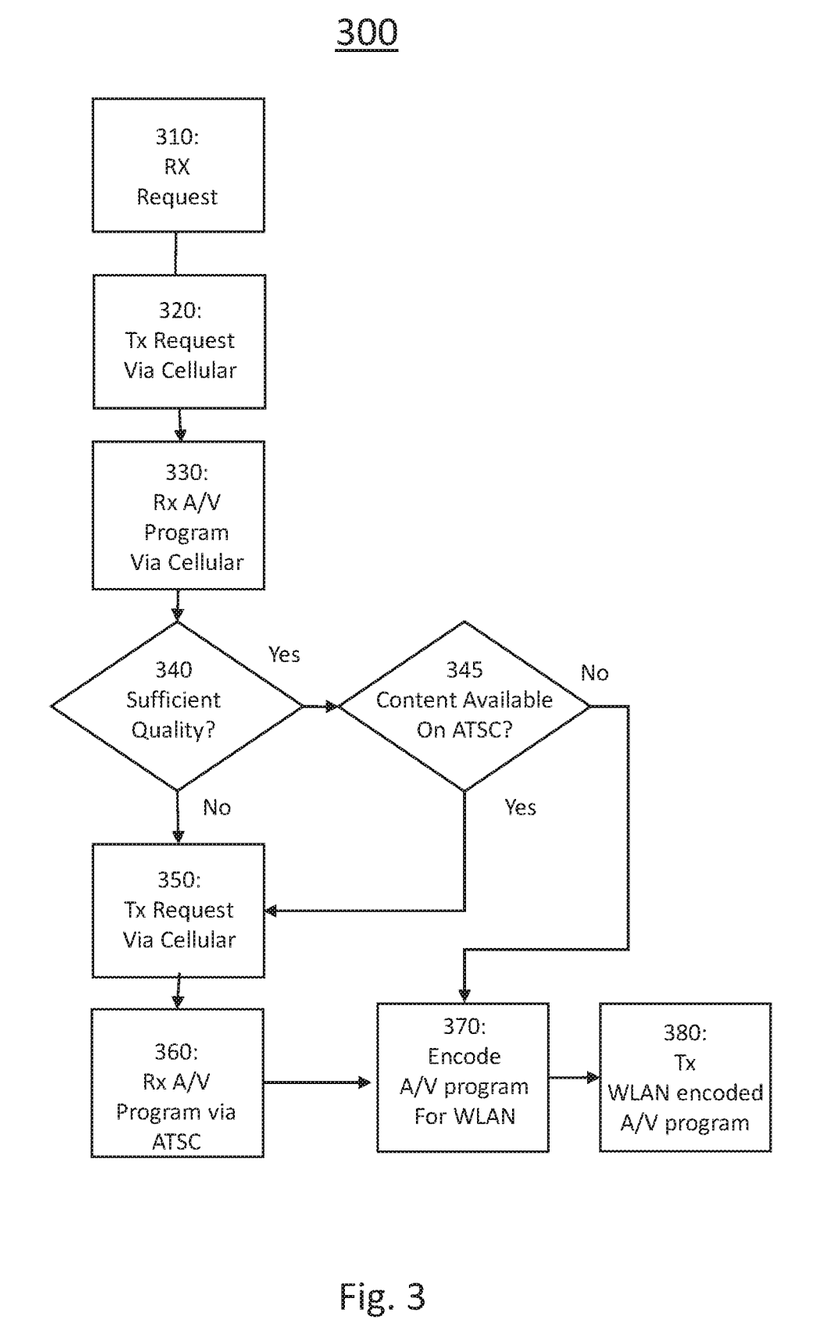
FIG. 3 shows a flowchart illustrating a method for facilitating reception of data via a wireless network according to an exemplary embodiment of the present disclosure.

Turning now to FIG. 3, a method 300 for facilitating reception of data via a wireless network according to an exemplary embodiment of the present disclosure is shown. The method is first operative to receive 310 a request for data from a user device. The request may be received via a WLAN network and may be indicative of a request for an electronic data file, such as an audio video program, digital data files, or the like. In a first exemplary embodiment, the data may be a streaming audio video program wherein the data is transmitted in such a way that a first portion of the audio video program may be displayed to a user while a second portion or the audio video program is being transmitted by the data server and received by the display device or other data storage and buffering device.

The method is next operative to transmit 320 a request for the data via a cellular network and cellular transceiver to the data server. For example, the request may be transmitted via a cellular data network to a cellular transceiver wherein the cellular transceiver may then be configured to couple the request to a network interface for transmitting the request via a network, such as the internet, to the data server.

In response to the request, the method may then receive 330 the data from the data server via the cellular wireless network. The method next determines 340 if the received data is of sufficient quality for retransmission to the user. The quality of the data may be determined in response to data transmission rate, signal quality, signal strength or the like. For example, if the available bandwidth is not sufficient to support an uninterrupted retransmission of the data to the user device, the data quality or signal quality may be determined to be insufficient. If the signal quality is sufficient, the method may then optionally determine if the data is available via the ATSC wireless transmission 345. Thus, if the data is available via ATSC wireless transmission, the exemplary method may opt to receive the data via ATSC wireless transmission to reduce data traffic via the cellular network. In this case, the method would then transmit 350 a request to an ATSC transmitter, via a cellular network, to transmit the data via an ATSC wireless transmission. If the data is not available via ATSC wireless transmission, the method would then couple the decoded data to the encoder for encoding 370 the data for transmission via a WLAN or the like. The method is then operative to transmit 380 the data via the WLAN to the requesting user device.

If the signal quality is insufficient 340, the method would then transmit 350 a request to an ATSC transmitter to transmit the data via an ATSC wireless transmission. In one exemplary embodiment, the request is transmitted via the cellular network and the internet to the ATSC transmitter. A confirmation with transmission identification data may be transmitted by the ATSC transmitter via the cellular network and received by the method. The method is then operative to receive 360 the data via the ATSC transmission and to decode the ATSC signal to extract the requested data. The method then couples the decoded data to the encoder for encoding 370 the data for transmission via a WLAN or the like. The method is then operative to transmit 380 the data via the WLAN to the requesting user device.

Figure 4:
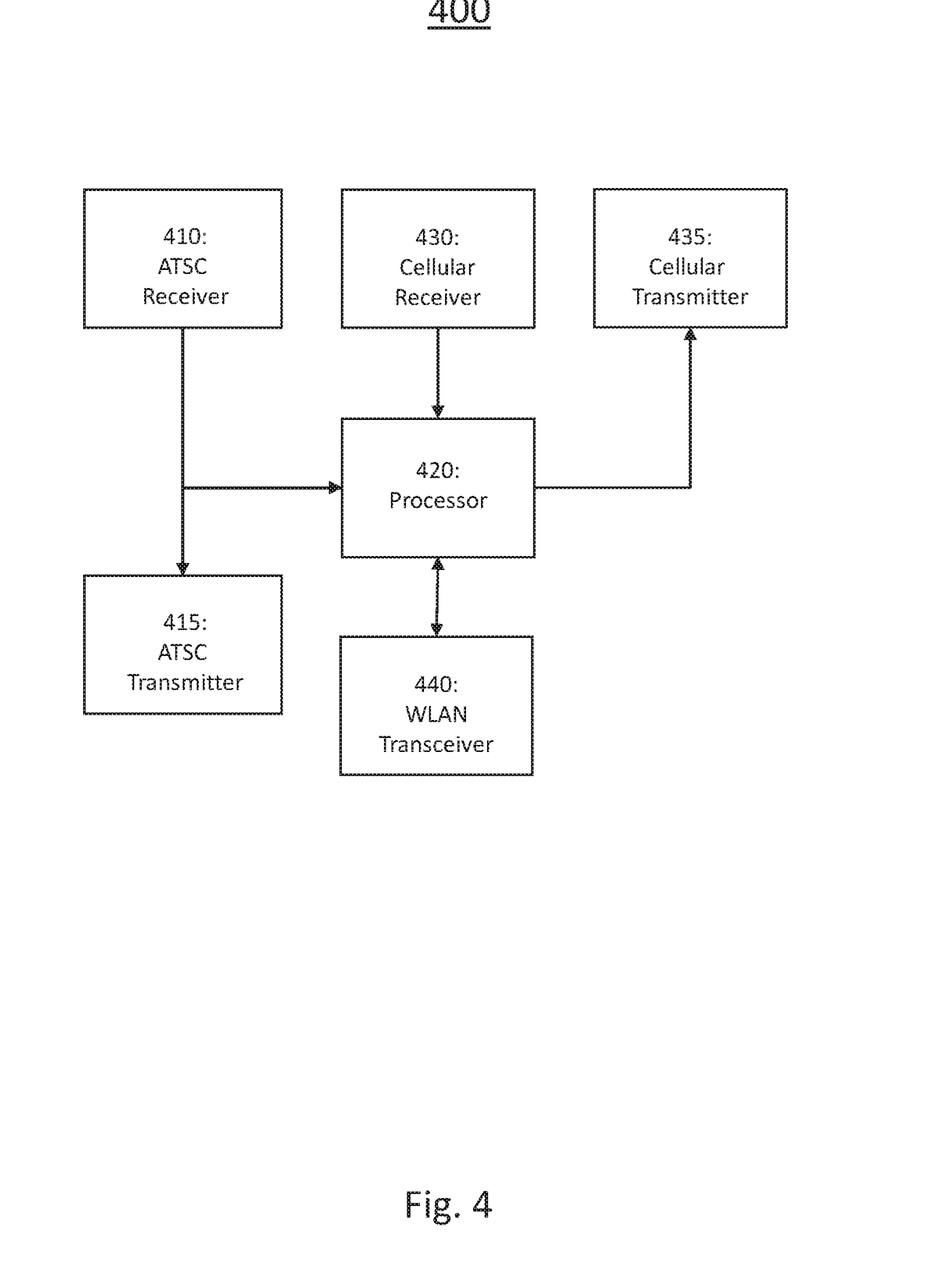
FIG. 4 shows a block diagram illustrating a system for reception of an audio video program and other data according to another exemplary embodiment of the present disclosure.

Turning now to FIG. 4, a system 400 for reception and retransmission of electronic data according to an exemplary embodiment of the present disclosure is shown. The exemplary system 400 may be a hotspot operative to transcode an audio video program include an ATSC receiver 410, ATSC transmitter 415, a cellular receiver 430, a cellular transmitter 435, a WLAN transceiver 440 and a processor 420.

In this exemplary embodiment, the an ATSC receiver 410 is configured for receiving an ATSC signal and decoding the ATSC signal to generate a first data signal. The ATSC signal may be received via wireless transmission from an ATSC broadcast transmitter via an ATSC antenna integral to, or coupled to, the ATSC receiver 410. In one exemplary embodiment, the ATSC broadcast transmitter may be a television broadcast antenna and wherein the ATSC signal is transmitted on a channel, such as a data channel of the ATSC broadcast spectrum. In addition, the exemplary system may include an ATSC transmitter 415 coupled to the ATSC antenna for transmitting data via an ATSC wireless transmission to an ATSC transmission tower and receiver for coupling to a data network, such as the internet. In one exemplary embodiment, the ATSC 3.0 may allow for two-way, internet protocol data transmission.

The exemplary cellular receiver 430 may be configured for receiving a cellular data signal and decoding the cellular data signal to generate a second data signal. In one embodiment, the cellular data signal may be a 5G formatted cellular data signal. The cellular transmitter 435 may be configured for transmitting a data request and a network request via a wireless cellular network. In an exemplary embodiment, the cellular receiver and the cellular transmitter from a cellular transceiver. The cellular transceiver may be operative to transmit to, and receive 5G signals from, a cellular base station coupled to a wired network, such as the internet.

The WLAN transceiver 440 may be operative for transmitting a wireless network signal and receiving a data request via a wireless network signal. In an exemplary embodiment, the data request may be generated by a user display device in response to a user input. The user input may be indicative of a request for a streaming audio video program. The wireless network signal may be used to transmit the streaming audio video program to the user display device.

The processor 420 may be operative to receive the data request from the wireless local area network transceiver and to couple the data request to the cellular transmitter. The processor 420 may be further operative to receive the data via the cellular data signal from the cellular receiver and to determine a quality of the data. In one exemplary embodiment, the cellular data signal includes an audio video program. The processor 420 is then operative to determine the quality of the cellular data signal in response to a quality of the audio video program decoded from the cellular data signal. In response to the quality of the data being below a threshold quality level, the processor 420 may be further operative to transmit a network request for a data via an ATSC signal, for receiving the data via the ATSC signal, and for coupling the data to the wireless local area network transceiver for transmission via the wireless network signal.

In one exemplary embodiment the data may be an audio video program and the wireless network signal wherein the audio video program is received sequentially such that a first portion of the audio video program may be transmitted via the wireless network signal while a second portion of the audio video program is being received via the ATSC signal. The wireless network signal may be transmitted to a user display device for display of the audio video program to a user. The processor 420 may be further operative to receive an ATSC transmission confirmation via the cellular receiver and wherein the ATSC transmission confirmation is indicative of an ATSC channel.

In another exemplary embodiment, the exemplary system 400 may be a wireless hotspot including a cellular transceiver 430, 435 configured to transit a request for the ATSC encoded audio video program and for receiving a cellular signal, an ATSC receiver 410 configured to receive an ATSC signal having an ATSC encoded audio video program wherein the ATSC receiver 410 includes an ATSC decoder for decoding the ATSC encoded audio program to generate a desired audio video program. The exemplary system may further include a WLAN transceiver 440 operative to receive a request for the desired audio video program and to transmit the desired audio video program to a user display device and a processor 420 operative to receive the request for the desired audio video program, to determine a signal quality of the cellular signal in response to the request for the desired audio video program, to transmit the request for the ATSC encoded audio video program in response to the signal quality being lower than a threshold signal quality, for receiving the desired audio video program from the ATSC decoder and to couple the desired audio video program to the wireless local area network transceiver. The signal quality of the cellular signal may be determined in response to at least one of a bandwidth, a bit rate, a bit error rate, and an amplitude.

Figure 5:
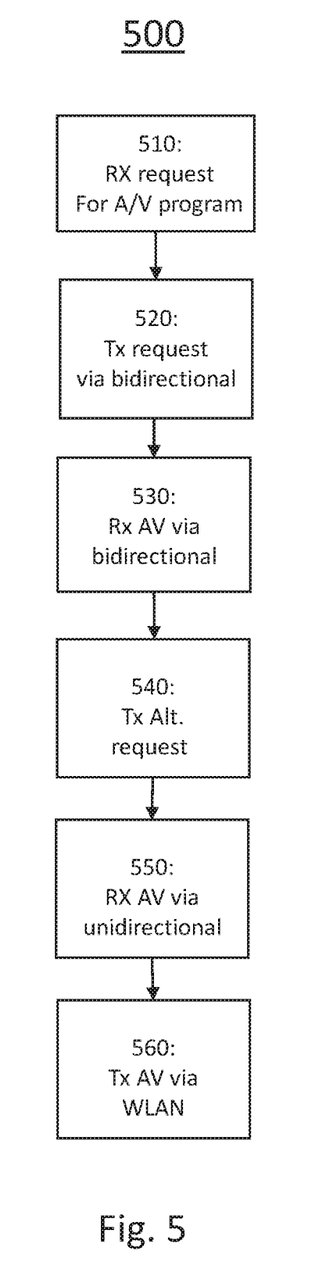
FIG. 5 shows a flowchart illustrating a method for reception of an audio video program and other data according to another exemplary embodiment of the present disclosure.

Turning now to FIG. 5, a method 500 for facilitating reception of data via a wireless network according to an exemplary embodiment of the present disclosure is shown. The method is first operative for receiving 510 a request for an audio video program from a display device. The request may be generated in response to a user input at the display device and received via a WLAN signal. In one exemplary embodiment, the display device may be a mobile phone wirelessly coupled to a hotspot via a Wi-Fi signal and wherein the hotspot is operative for performing the exemplary method.

The method is next operative for transmitting 520 the request for the audio video program via a bidirectional network. In one example, the bidirectional network may a cellular data network such as a 5G network and/or a 4G LTE network. The request may be transmitted to a cellular network cell tower via a cellular transceiver.

The method may next receive 530 the audio video program via the bidirectional network wherein the audio video program is received at a first data rate. The method may then be operative to compare the first data rate to a threshold data rate to determine a signal quality. For example, if the first data rate is less than the threshold data rate, the signal quality may be poor. If the first data rate is greater than the threshold data rate, the signal quality may be good. A poor signal quality may be an indicator that the audio video program is unsuitable for retransmission to a display device for presentation to a user.

The method is next operative for transmitting 540 an alternate request for the audio video program via the bidirectional network in response to the quality being poor. The alternate request for the audio video program may include a request for the audio video program to be transmitted via the unidirectional wireless transmission. The alternate request for the audio video program may be transmitted in response to a signal quality being lower than a threshold signal quality.

The method is next operative for receiving 550 the audio video program via the unidirectional wireless transmission. In one exemplary embodiment, the unidirectional wireless transmission may be an ATSC encoded wireless transmission from an ATSC broadcast transmission tower or antenna. The method may the transmit 560 the audio video program to the display device. In one exemplary the audio video program is transmitted to the user device via a WLAN signal such as an IEEE 802.11 encoded signal.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the disclosure in any way. To the contrary, various changes may be made in the function and arrangement of the various features described herein without departing from the scope of the claims and their legal equivalents.

The invention claimed is:

1. A method executable by a base station apparatus in communication with a media player device via a local area network (LAN), the method comprising:
   receiving a request for an audio video program from the media player device via the local area network;
   transmitting the request for the audio video program via a bidirectional wireless telephone network;
   responsively receiving the audio video program via the bidirectional wireless telephone network, wherein the audio video program is received at a first data rate;
   if the first data rate falls below a threshold signal quality, the base station transmitting an alternate request for the audio video program via the bidirectional wireless telephone network, wherein the alternate request for the audio video program includes a request for the audio video program to be transmitted to the base station via a unidirectional wireless transmission that is separate from the bidirectional wireless telephone network;
   receiving the audio video program via the unidirectional wireless transmission in a television broadcast format;
   transcoding the received audio video program from the television broadcast format to a format that is compatible with the local area network; and
   transmitting the transcoded audio video program to the display device via the local area network.

2. The method of claim 1 wherein the bidirectional wireless telephone network is a cellular data network.

3. The method of claim 1 wherein the bidirectional wireless telephone network is a 5G wireless communications network.

4. The method of claim 1 wherein the unidirectional wireless transmission is an ATSC encoded wireless transmission.

5. The method of claim 1 wherein the unidirectional wireless transmission is a received via a television broadcast antenna coupled to the base station apparatus.

6. The method of claim 1 wherein the audio video program is received by a direct broadcast satellite antenna coupled to the base station apparatus.

7. The method of claim 1 wherein the audio video program is transmitted to the user device via an IEEE 802.11 ac encoded signal.

8. An apparatus configured to provide media streams to a media player device, the apparatus comprising:
   an ATSC receiver configured for receiving an ATSC broadcast signal and for decoding the ATSC broadcast signal to generate a first data signal;
   a cellular receiver configured for receiving a cellular data signal and for decoding the cellular data signal, wherein the cellular data signal includes an audio video program;
   a cellular transmitter configured for transmitting a data request and a network request via a wireless cellular network;
   a wireless local area network transceiver configured to receive a data request from the media player device that identifies a media program for streaming; and
   a processor operative to receive the data request from the wireless local area network transceiver, to couple the data request to the cellular transmitter, to initially receive and decode the media program for streaming via the cellular data signal from the cellular receiver, to determine a quality of the cellular data signal in response to a quality of the media program decoded from the cellular data signal, in response to the quality of the cellular data signal being below a threshold quality level, to transmit network request via the cellular transmitter requesting to receive for the media program from the ATSC receiver, and to transcode the received media program received via the ATSC receiver from a television broadcast format to a format that is transmittable via the wireless local area network to the media player device.

9. The apparatus of claim 8 wherein the cellular data signal is a 5G formatted cellular data signal.

10. The apparatus of claim 8 wherein the ATSC receiver is operative to decode the ATSC signal to extract the media program.

11. The apparatus of claim 8 wherein the processor is further operative to receive an ATSC transmission confirmation via the cellular receiver and wherein the ATSC transmission confirmation is indicative of an ATSC channel.

12. The apparatus of claim 8 wherein the data request is generated by the media player device in response to a user input.

13. The apparatus of claim 8 wherein the wireless network signal is transmitted to the media player device.

14. The apparatus of claim 8 wherein the media program is received sequentially such that a first portion of the audio video program is transmitted via the wireless network signal while a second portion of the audio video program is received via the ATSC signal.

15. A wireless hotspot comprising:
   a cellular transceiver configured to transit a request for the ATSC encoded audio video program and for receiving a cellular signal;
   an ATSC receiver configured to receive an ATSC signal having an ATSC encoded audio video program;
   an ATSC decoder for decoding the ATSC encoded audio program to generate a desired audio video program;

a wireless local area network transceiver operative to receive a request for the desired audio video program and to transmit the desired audio video program to a user display device; and a processor operative to receive the request for the desired audio video program, to determine a signal quality of the cellular signal in response to the request for the desired audio video program, in response to the signal quality being lower than a threshold signal quality, to transmit the request for the ATSC encoded audio video program via the cellular transceiver to subsequently receive the desired audio video program from the ATSC decoder, to transcode the audio video program received from the ATSC decoder from a broadcast television format to a network format compatible with the local area network, and to transmit the transcoded audio video program to the wireless local area network transceiver.

16. The apparatus for of claim 15 wherein the signal quality of the cellular signal is determined in response to at least one of a bandwidth, a bit rate, a bit error rate, and an amplitude.

* * * * *